United States Patent [19]

Horiguchi et al.

[11] Patent Number: 4,843,435
[45] Date of Patent: Jun. 27, 1989

[54] CONVEYOR OF A COPYING APPARATUS

[75] Inventors: Masashi Horiguchi; Minoru Yakubo, both of Tokyo; Masanori Yokota; Hideharu Oshima, both of Saitama, all of Japan

[73] Assignee: Fuji Photo Film Co., Ltd., Kanagawa, Japan

[21] Appl. No.: 181,123

[22] Filed: Apr. 13, 1988

[30] Foreign Application Priority Data

Apr. 13, 1987 [JP] Japan .................................. 62-90550

[51] Int. Cl.⁴ ............................................. G03B 27/30
[52] U.S. Cl. ..................... 355/100; 355/27; 355/132
[58] Field of Search .................. 355/27, 45, 100, 115, 355/132

[56] References Cited

U.S. PATENT DOCUMENTS

| | | | |
|---|---|---|---|
| 3,904,292 | 9/1975 | Rauich | 355/100 |
| 4,053,225 | 10/1977 | Morohashi | 355/115 |
| 4,082,446 | 4/1978 | Driscoll et al. | 355/45 X |
| 4,529,302 | 7/1985 | Tisserand et al. | 355/100 X |
| 4,624,558 | 11/1986 | Johnson | 355/100 |
| 4,626,099 | 12/1986 | Zuelke et al. | 355/100 X |
| 4,797,710 | 1/1989 | Ishikawa | 355/100 X |

Primary Examiner—Richard A. Wintercorn
Attorney, Agent, or Firm—Sughrue, Mion, Zinn, Macpeak & Seas

[57] ABSTRACT

A conveyor apparatus used in a copying apparatus of the type using separate diffusion transfer photographic materials, and a photosensitive material in the form of a roller contained in a magazine which is withdrawn and cut to a predetermined length to form a photosensitive sheet. A latent image is created in the photosensitive sheet by exposing it using a light source, and an image-receiving material in the form of a sheet is superposed under the exposed photosensitive sheet. A positive image is formed on the image-receiving material using a diffusion transfer processing. The image-receiving sheet is withdrawn from a cassette wherein a stack of image-receiving sheets are contained. The conveyor apparatus includes feeding rollers disposed in front of the cassette for feeding the image-receiving sheet to a superposition station of the apparatus, an extracting roller for extracting an uppermost image-receiving sheet in the stack and transferring it to a position between the feeding rollers so that it is nipped by the rollers, and a sensor for detecting the image-receiving sheet nipped between the feeding rollers to cause withdrawing rollers to rotate so as to withdraw the photosensitive material from the magazine and transport it to an exposure station where the exposing is performed. If the sensor does not detect the image-receiving sheet within a predetermined time, copying operations are suspended.

7 Claims, 6 Drawing Sheets

CONVEYOR OF A COPYING APPARATUS

Background of the Invention

The present invention relates to a conveyor of a diffusion transfer type copying apparatus for conveying copy materials.

In a diffusion transfer type copying apparatus, two separate copy materials are used: a negative or photosensitive material in which a latent image is created as a result of exposure and a positive or image-receiving material where the positive image is formed.

One such diffusion transfer type copying apparatus is disclosed in Japanese Patent Unexamined Publication No. 59-204,042. In the apparatus taught by this Japanese Publication, a photosensitive material in the form of a roll contained in a magazine is withdrawn therefrom and cut to a predetermined length to thereby form a photosensitive sheet. The sheet is conveyed to an exposure station, where it is held flat so as to be exposed. After exposure, the sheet is superposed with an image-receiving material in the form of another sheet, which has been withdrawn from a cassette. The two sheets are then passed through a developing reagent and then held for a time in a storing chamber for diffusion transfer processing. Upon the completion of diffusion transfer processing, the image-receiving sheet is peeled apart from the photosensitive sheet. Thus, a positive transfer image is formed on the image-receiving sheet, and the image-receiving sheet is, after having been washed and dried, taken out of the copying apparatus.

A camera type copying apparatus, in which a roll of photosensitive material and a sheet of image-receiving material are used, has been proposed. An example of such a camera type copying apparatus is to be found in Japanese Patent Unexamined Publication No. 61-138,935.

Because the photosensitive material which is thinner than the image-receiving sheet is contained in the form of a roll in a magazine, a large number of copies can be made from a roll of photosensitive material. However, since the image-receiving sheet not only is thick itself but also has a pod containing a processing reagent, it is hard to stack a large number of image-receiving sheets in a cassette. Therefore, running out of image-receiving sheets during copying is a problem in such a copying apparatus.

In the conventional copying apparatus, when a copying button is operated, a photosensitive material is withdrawn from the magazine and an exposure is made with no reference to whether an image-receiving sheet or image-receiving sheets are in a casette or not. Therefore, if there is no image-receiving sheet in the cassette, the photosensitive material is wasted.

SUMMARY OF THE INVENTION

It is an object of the present invention to provide a copying material conveyor apparatus in a copying machine in which the withdrawal of photosensitive material is suspended when the copier is out of image-receiving sheets.

The above object of the present invention is achieved by providing a conveying apparatus including a mechanism for extruding an image-receiving sheet from a cassette to force it to be bit between a pair of feed rollers; a sensor for detecting the image-receiving sheet being bitten by the feed rollers; withdrawing rollers for withdrawing a photosensitive material in the form of a roll contained in a magazine; and a controller for allowing the withdrawing rollers to rotate when the sensor detects the image-receiving sheet bit between the feed rollers and suspending the withdrawing rollers when the sensor detects no image-receiving sheet.

According to a feature of the present invention, when a copy start button is operated, the extruding mechanism extrudes the foremost image-receiving sheet of a stack of image-receiving sheets contained in a cassette and forces the sheet to be bit between a pair of feed rollers. The sensor, during detection of the image-receiving sheet bit between the feed rollers, provides the controller with a signal. During the signal, the controller continues to control the copying operation, causing the withdrawing rollers to rotate so as to withdraw the photosensitive material from the magazine, form a photosensitive sheet, and advance the sheet to an exposure position. In contrast, if the controller does not receive a signal from the sensor, the controller suspends the copying apparatus from withdrawing and cutting the photosensitive material, and thereby avoids interrupting a copying operation.

DETAILED DESCRIPTION OF THE INVENTION

Figure 1:
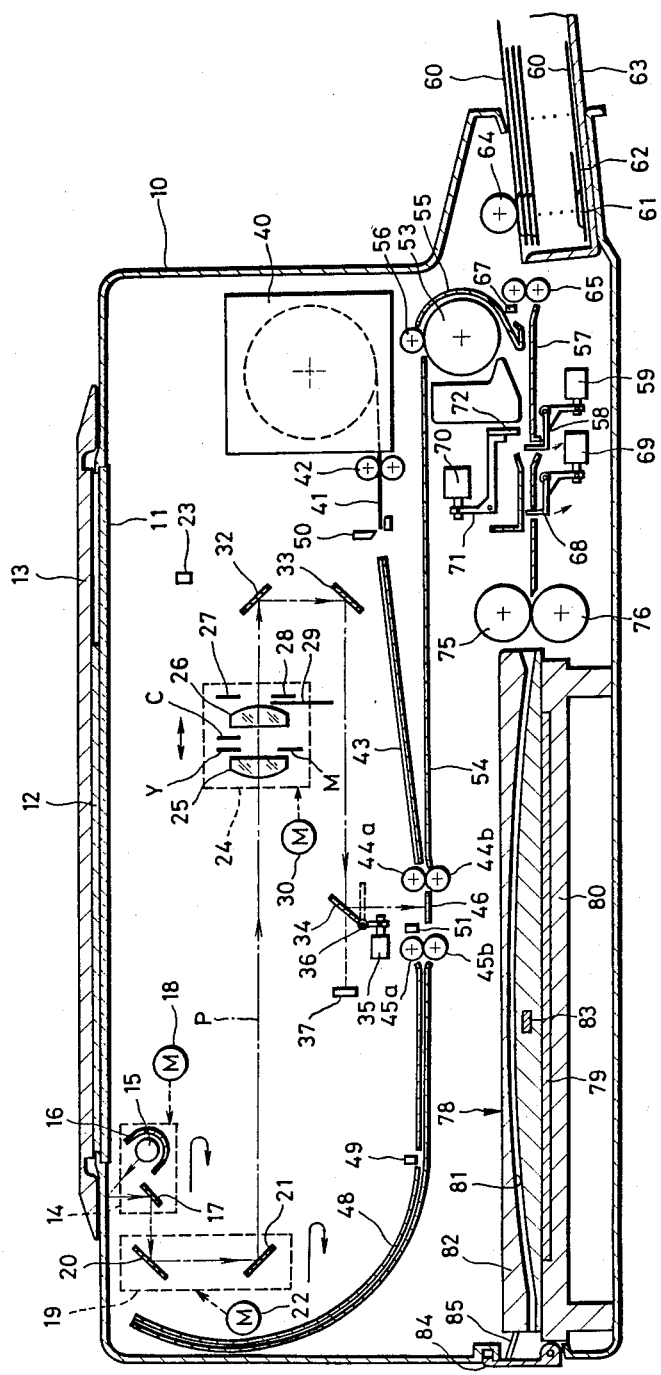
FIG. 1 is a schematic illustration of a copying apparatus embodying the present invention.

Referring now to FIG. 1, a silver salt type color copying apparatus 10 is shown. Over the top of the copying apparatus 10, there is a transparent table 11 on which a color original 12 (from which a copy is made) is placed with its front side facing down. A cover plate 13 having a white inner surface is provided for covering the original 12.

An illumination light unit 14, which includes therein an illumination lamp 15, a reflector 16 and a reflection mirror 17, is moved back and forth in parallel with the transparent table 11 by means of a first motor 18 so as to scan the color original 12 with, for example, an illumination light formed in a line by a slit member (not shown). Adjacent the light unit 14, there is a mirror unit 19 having two mirrors 20 and 21 disposed positioned at a right angle (with respect to each other) to reflect and feed back light from the light unit 14. The mirror unit 19 is synchronized with the light unit 14 to move back and forth at one-half the speed of the light unit 14 by means of a second motor 22 coupled to the unit 19 through a driving belt (not shown), to thereby maintain a constant distance to the original. The mirror unit 19 is adapted to be adjusted in position relative to the light unit 14 when copying magnification is to be changed. Under one end of the transparent table 11, there is a sensor 23 such as a micro-switch to detect the presence of the light unit 14 at the end of scanning.

A lens unit 24 has front and rear lens groups 25 and 26 (which are shown as single-element lens groups for simplicity), three color filters, namely yellow Y, cyan C and magenta M, disposed between the front and rear lens groups 25 and 26, and aperture plates 27 and 28 disposed behind the rear lens group 26. The plates 27 and 28 are movable in opposite directions. The color filters Y, C, and M are insertable into and removable from optical axis P of the lens uniti 24 independently of each other to regulate the amount of exposure light passing therethrough. Thus, the three color components of light, and hence the balance of exposure light, is controlled. The three color filters Y, M and C, may, although being movable independently of each other in this preferred embodiment, be replaced with two color filters attached to a slidable transparent plate as is shown in Japanese Patent Publication No. 44-2542.

It is worth noting that ink used for printing color articles generally has a sensitivity distribution with a peak at about 570 nm for green and dyes used for making photographic color prints have a sensitivity distribution with a peak at about 535 nm for green. In contrast, the photosensitive material used in this embodiment has a sensitivity distribution with a peak about 560 nm for green.

To make copies from a printed original and a photographic original under the same copying condition, a green absorption filter 29 is retractably disposed between the rear lens group 26 and the apertures 27 and 28 to cut or absorb partially green light having relatively longer wavelengths. This green absorption color filter 29 is moved out of the optical path P when the light unit 14 scans the original 12 to detect its color density prior to copying. It is to be understood that, if using a photographic material having a sensitivity distribution with a peak at a relatively short wavelength, for example 540 nm, for green, no green absorption color filter 29 is needed. When the green absorption color filter 29 is completely inserted in the optical path P, then the aperture plates 27 and 28 move close to each other so as to regulate the amount of light. The lens unit 24 is moved along the optical path P to change its position so as to vary the magnification ratio.

For directing the light reflected from the original 12 to an exposure station 46, there are fixed mirrors 32 and 33, and a swingable mirror shutter 34. The shutter 34 rotates about a shaft 36 so that it can be removed from the optical path P when a solenoid 35 is energized so as to allow the light reflected form the original 12 to travel to a light measurement unit 37.

There is a magazine 40 containing a roll of a photographic (photosensitive) material 41 which can be processed by a diffusion transfer processing. The photosensitive material 41 is withdrawn by means of a withdrawing mechanism in the form of a pair of rollers 42 disposed in front of the magazine 40. Either one of the pair of withdrawing rollers 42 is adapted to move slightly up and down while being rotated, to thereby prevent the material 41 from deflecting sideways or becoming wavy.

Figure 2:
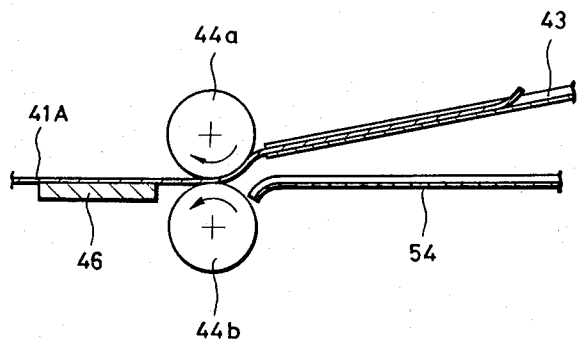
FIGS. 2(A) and 2(B) are illustrations showing a photosensitive paper conveyed by feeding rollers.
Figure 2:
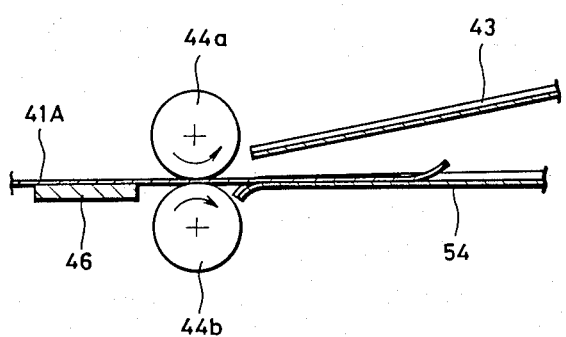

As is shown in detail in FIG. 2(A), the material 41 withdrawn from the paper magazine 40 is guided along its opposite sides by means of guide rails 43 in the form of a U-shaped channel. The guide rail 43 is inclined upwardly at an angle. The rail is also deviated upwardly at its forward end from the center, between a pair of conveyor rollers 44a and 44b. The rollers 44a and 44b are disposed on one side of the exposure station 46 and are formed of a wide hollow drum which bite and apply an appropriately weak force to the material 41 so as to prevent it from becoming fogged due to pressure.

Disposed opposite to the conveyor rollers 44a and 44b and on the other side of the exposure station 46 is another pair of conveyor rollers 45a and 45b. These two pairs of conveyor rollers 44a and 44b, 45a and 45b are synchronized with the withdrawing rollers 42 so as to force and convey the photosensitive material 41 through an upwardly curved passage 48. This curved passage is defined by a hollow chute having a thin rectangular cross section made of plastic or steel. The curved passage 48 contributes to shortening the overall length of the copying apparatus. If there is insufficient space to accommodate an upwardly curved passage 48, the passage can be curved downwardly. It is also permissible to form a passage by using multiple rollers and guide members.

When the photosensitive material 41 is detected at its leading end by a sensor 49, a cutter 50 is caused to cut the material 41 into a predetermined length to form a photosensitive sheet 41A. The sheet 41A is further conveyed by the conveyor rollers 44a and 44b, 45a and 45b until a sensor 51 detects the rear end of the sheet. At the moment the sensor 51 detects the end of the sheet, all the conveyor rollers stop their rotation.

When making a copy from the color original 12, the conveyor rollers 44a, 44b, 45a and 45b are rotated in reverse in synchronism with the rotation of the light unit 14 so as to move the sheet 41A back toward a rotary drum 53, exposing the sheet at the exposure station 46.

As is shown in detail in FIG. 2(B), between the conveyor rollers 44a and 44b and the rotary drum 53 there is a guide plate 54 disposed in a horizontal plane passing the center between the conveyor rollers 44a and 44b. Because the guide rails 43 are, as previously described, deviated upwardly at their forward end, the sheet 41A moving back is prevented from being caught by the end of the guide rails 43. As a result, the photosensitive sheet 41A smoothly enters between the guide rails 43 and the guide plate 54, advancing in a horizontal direction along guide plate 54.

There is a curved guide member 55 extending around the rotary drum 53, and there is a roller 56 in contact with the outer periphery of the rotary drum 53. The rotary drum 53 advances and sends the sheet 41A along the curved guide member 55 until the rear end (now the lending end) of the sheet 41A is stopped by a first stopper 58. This stopper 58 places the sheet 41A in position and then is retracted under a guide plate 57 by means of a solenoid 59.

A cassette 63 is mounted on the copying apparatus 10. In this cassette 63 there is a stack of a plurality of positive material or image-receiving sheets 60. Each of the sheets 60 has, near its leading end, a rupturable pod 61 containing a processing reagent therein and a funnel member 62 in the form of an envelope for directing the processing reagent released from the pod 61. An extrusion roller 64 is brought into contact with the uppermost image-receiving sheet 60 upon mounting the cassette 63 on the apparatus 10 and extrudes the sheet forward between a pair of feed rollers 65. When a sensor 67 disposed adjacent to the feed rollers 65 detects the leading end of the image-receiving sheet 60, the extrusion roller 64 stops. Then, another photosensitive material 41 is withdrawn from the magazine 40.

After placing of the exposed photosensitive sheet 41A in position by the first stopper 58, the extrusion roller 64, as well as the feed rollers 65, is caused again to rotate, further advancing the uppermost image-receiving sheet 60 until its leading end is stopped by a second stopper 68 operated by a solenoid 69, thereby placing the sheet 60 under the sheet 41A. It is noted that the extrusion roller 64 is formed to contact only with side margins of the image-receiving sheet 60 so as not to rupture the pod 61. The feed rollers 65 are made spongy to produce only a slight pressure therebetween to avoid rupturing the pod 61. It is also to be noted that the sheets 41A and 60 have the same construction of material layers as peel-apart type instant film units now available in the market.

When the image-receiving sheet 60 is in position at the second stopper 68, a solenoid 70 is actuated to move down a lever 71, having a sealing means 72 attached to its end, so as to connect the ends of the sheet 41A and the sheet 60. Owing to this connection, the two separate sheets are maintained in registry. For a more positive connection, it is preferred to previously apply a hot melt cementing reagent onto the funnel 62.

The superposed sheets 41A and 60 are passed between a pair of processing rollers 75 and 76 to rupture the pod 61. As the sheets are advanced by the processing rollers 75 and 76, the processing reagent released from the pod 61 is distributed in a uniform layer between the sheets 41 and 60. The sheets 41 and 60 are then conveyed to a heating section 78 for heating them at a predetermined temperature. This heating section includes a heater 79 incorporated in a table 80 and a plate 82 maintained at a constant temperature. Reference numeral 83 is a sensor for detecting the temperature of the heater. After a predetermined time, a door 84 is opened to withdraw the top end of the plate 82 from the apparatus 10 through a lever 85.

Figure 3:
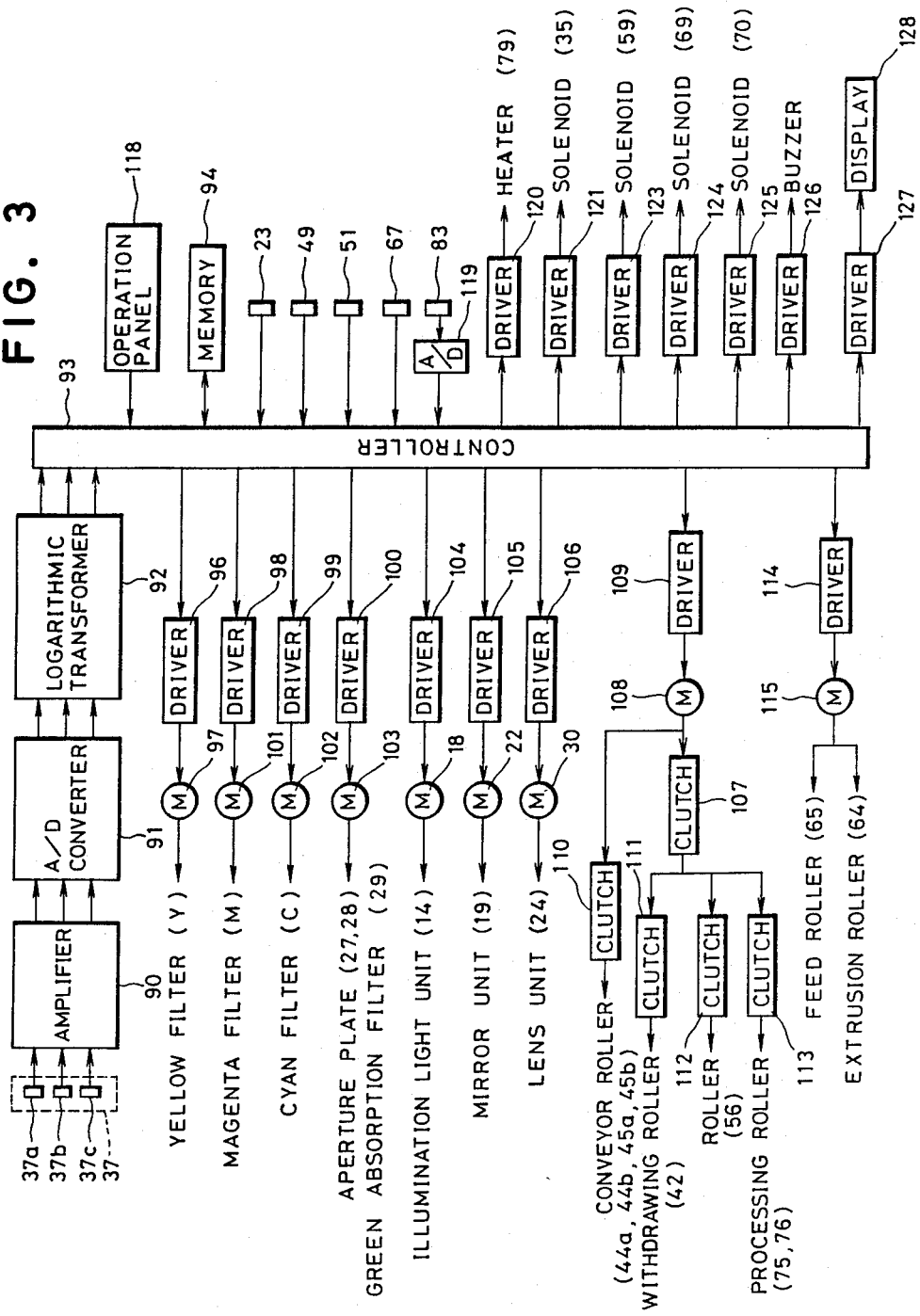
FIG. 3 is a block diagram showing a control circuit for the copying apparatus of FIG. 1.

The apparatus works in cooperation with a circuit shown in FIG. 3. The light measuring unit 37 comprises three light sensors 37a, 37b and 37c for blue, green and red, respectively for detecting light intensities of these three components of exposing light. Outputs from these three light sensors 37a to 37c are amplified by an amplifier 90 and then converted into digital signals by an A/D converter 91. The digital signals are then logarithmically transformed by a logarithmic transformer 92 to provide density signals for the three colors, and the density signals are in turn written in a memory by means of a controller 93. The controller 93 operates various sections of the apparatus to effect a sequential control of operation in accordance with a control program stored in the memory 94.

According to the density signals from the light measuring unit 37, the controller 93 causes a driver 96 to rotate a motor 97 so as to adjust the yellow filter (Y) in position. In the same way, the controller 93 causes drivers 98 to 100 to rotate motors 101 to 103, respectively, so as to adjust the magenta, cyan and green absorption filters (M), (C) and 29 and the aperture plates 27 and 28 in position. To control movement of the light unit 14, mirror unit 19 and lens unit 24, there are motors 18, 22 and 30 which cooperate with drivers 104 to 106, respectively, connected to the controller 93. A motor 108 connected to the controler 93 through a driver 109 is rotatably coupled to the conveyor rollers 44a, 44b, 45a and 45b through a clutch 110 and to the feed rollers 42, the roller 56 and the processing rollers 75 and 76 through clutches 107 and 111 to 113, respectively. A motor 115 connected to the controller 93 through a driver 114 is rotatably coupled to the extrusion roller 64 and feed rollers 65.

Connected to the controller 93 is an operation panel 118 which is provided with a copying button or key for starting a copy, color correction keys for manually effecting color balance corrections, density correction keys for manually effecting density corrections and other keys. The temperature sensor 83 detects a temperature of the heating section 78 to provide a signal which in turn is converted into a digital signal by an A/D converter 119 and then is sent to the controller 93. Drivers 120 through 125 connected to the controller 93 drive the heater 79 and solenoids 35, 59, 69 and 70, respectively. A driver 126 causes a buzzer (not shown) after expiration of a predetermined time allotted for development. A driver 127 causes a display 128 to indicate errors such as running out of paper or paper jamming.

Figure 4:
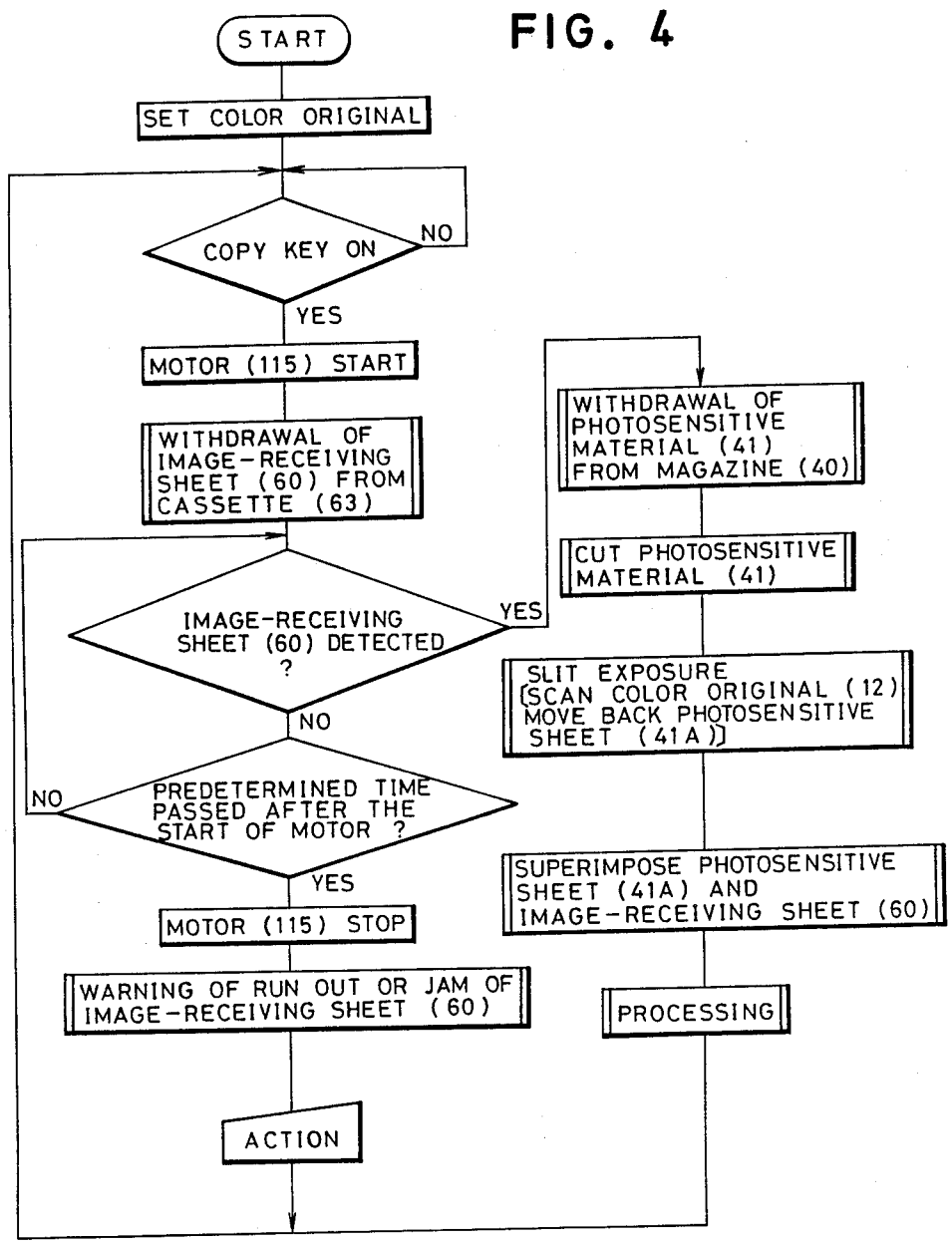
FIG. 4 is a flow chart showing a sequential control of an operation for conveying photosensitive and image-receiving material.

The sequential control of the copying apparatus according to the invention will now be described in detail with reference to FIGS. 4–9. As is shown in FIG. 4, at first, the color original 12 is placed on the transparent table 11 and is covered with the plate 13. The copying key on the operation panel 118 is pressed to start the control program, at which time the motors 97, 101 and 102 are started to set the color filters (Y), (M) and (C) to their initial positions. Simultaneously, the motor 103 is started to remove the green absorption filter 29 from the optical path P as well as to fully open the aperture plates 27 and 28.

The controller 93 controls the motor 18 to effect a pre-scanning of the original 12 while withdrawing an image-receiving sheet 60 from the cassette 63. When the motor 18 is rotated, the light unit 14 is moved together with the mirror unit 19 to scan the original 12 with a line illumination. The reflected light from the original 12 is directed toward the light measuring unit 37 through the mirrors 17, 20 and 21 and the lens unit 24, and then the mirrors 32 and 33, in the stated order. The measuring unit 37 (having the sensors 37a, 37b and 37c for blue, green and red) detects three color components of the reflected light to provide signals which are then amplified, converted into digital signals and then logarithmically transformed into density signals for storage in the memory 94.

As is shown in FIG. 4, during the pre-scanning, the motor 115 is actuated to rotate the extrusion roller 64 and the feed rollers 65 so as to withdraw the foremost image-receiving sheet 60 from the cassette 63. During withdrawal of the sheet 60, its leading end is detected by the sensor 67 upon exiting from the pair of feed rollers 65. The sensor 67 provides a signal which in turn is sent to the controller 93, which then stops the motor 115. If the sensor 67 does not detect the sheet 60 within a predetermined time after the actuation of the motor 115, the controller 93 stops the motor 115. That is caused when in fact the cassette 63 is empty or when the foremost sheet 60 is jammed before reaching the sensor 67. In these cases, the controller 93 causes the driver 127 to display a warning message such as "out of paper" or "paper jam" on the display device 128. According to these warning messages, an operator takes approriate action.

When the sensor 67 detects the leading end of the sheet 60, the controller 93 causes the motor 108 to rotate the withdrawing rollers 42, 44a, 44b, 45a and 45b to withdraw the photosensitive material 41 from the magazine 40 and advance it toward the exposure station along the guide member 43. As this guide member 43 is deviated upward with respect to the rollers 44a, the material 41 strikes the peripheral surface of the roller 44a and is smoothly nipped by the rollers 44a and 44b. The material 41 is lightly pressed by the rollers 4a and 44b, and forced to move toward the rollers 45a and 45b. As these rollers 44a, 44b and 45a, 45b continue to rotate, the material 41 enters into and advances along the curved passage 48.

Figure 5:
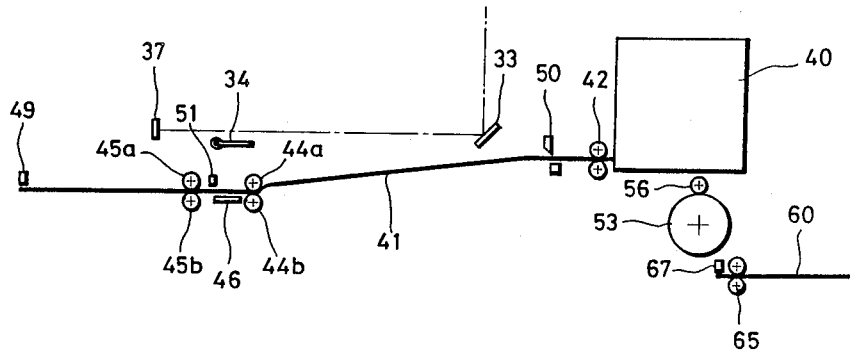
FIGS. 5 through 9 are schematic illustrations which show various positions of the photosensitive and image-receiving material during the conveyance thereof.
Figure 6:
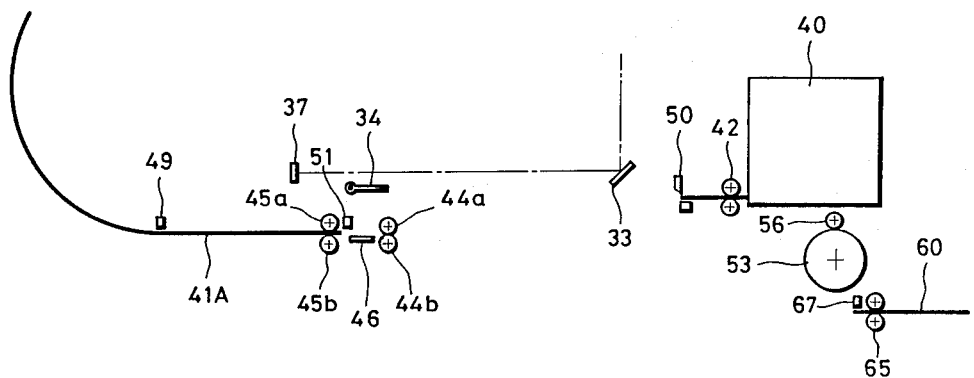

As is shown in FIG. 5, when the leading end of the material 41 is detected by the sensor 49, operation of the motor 108 is temporarily suspended. During this suspension, the cutter 50 is actuated to cut the material 41 into a predetermined length to form the photosensitive sheet 41A. At the completion of cutting, the motor 108 is started again. However, at this time, the withdrawing rollers 42 are restricted by the clutch 111 (see FIG. 3), and only the conveyor rollers 44a to 45b are allowed to continuously rotate. Thus, only the sheet 41A is advanced while the material 41 is left behind. When the rear end of the sheet 41A is detected by the sensor 51 as shown in FIG. 6, the motor 108 is stopped.

When the light unit 14 has moved the length of the original 12 and the unit is detected by the sensor 23, pre-scanning is complete. In response to detection of the light unit 14 by the sensor 23, the motor 18 starts to rotate in the reverse direction simultaneously with turning off the lamp 15, to return the light unit 14 to its original position. Thereafter, the controller 93 reads out densities for blue, red and green from the memory 94 to calculate exposures for these three colors. Based on the calculated exposures, the controller 93 causes the motors 97, 101 and 102 to rotate to adjust the color filters Y, M and C in position in order to regulate the components of exposing light. At this time, the motor 103 is also rotated so as to place the green absorption filter 29 in the optical path P to cut a longer wavelength component of green wavelength range of the line illumination light. It should be noted that, as the green absorption filter 29 has an elongated rectangular shape, a further movement of the green filter 29 in the optical path P causes the aperture plates 27 and 28 to move close to each other to adjust the amount of the line illumination light. Manual control of the components and the amount of slit illumination light can be performed by operating the color and density correction keys of the operation panel 118.

After the adjustment of the color filters and aperture plates, the controller 93 turns on the lamp 15 and causes the motor 18 to rotate to again move the light unit 14 and the mirror unit 19 to the right as viewed in FIG. 1, to scan the original 12 with the line illumination light. Simultaneously, the motor 108 is rotated in reverse to rotate the conveyor rollers 44a to 45b in the reverse direction through the clutch 110, to move sheet 41A from a position shown in FIG. 6 at the same speed as the light unit 14. Consequently, the sheet 41A is moved over the exposure position. Because the rollers 44a to 45b apply a gentle pressure against the sheet 41A, the sheet 41A is maintained flat while between the rollers 44a to 45b.

Even if the end of the sheet 41A is slightly curled, the rear end of the sheet 41a can enter smoothly between the guide members 43 and 54 because the ends of these guide members are disposed close to the rollers 44a and 44b. Therefore, the sheet 41A can be moved back over the horizontally disposed guide member 54 without being caught by the guide member 43. Owing to this smooth movement of the sheet 41A, the rollers 44a to 45b cause no slippage due to changes of load, thereby allowing the sheet 41A to move at a constant speed. As a result, no dark stripes are formed on a copy.

Figure 7:
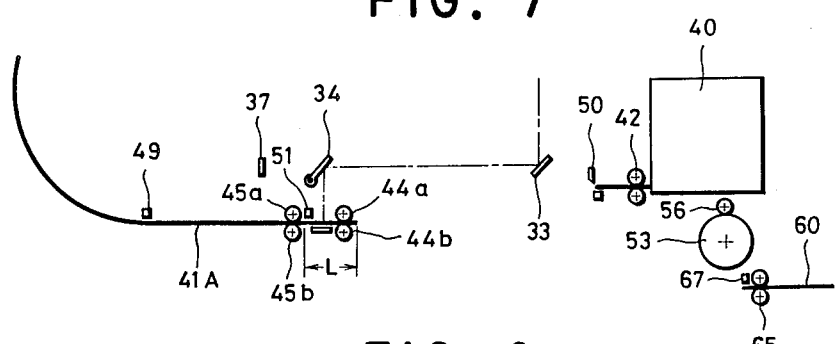

Following the movement of the sheet 41A by the rollers 44a to 45b, the speed of movement of the sheet 41A becomes stable. Therefore, the sheet 41A is well synchronized with the light unit 14 and the sheet is also maintained very flat, so that exposure of the sheet 41A is performed with high stability. For such a stable exposure, the mirror shutter 34 is actuated after a predetermined time from the initiation of movement of the sheet 41A to effect exposure of the sheet 41A. At the beginning of exposure, as is shown in FIG. 7, the sheet 41A has been moved by a distance L and placed on the guide member 54. During exposure, exposure light reflected from the original 21 travels through the lens unit 24 and is reflected downwardly by the mirror shutter 34, and thereafter reaches the slit exposure station 46 to form a latent image of the color original on the sheet 41A.

Figure 8:
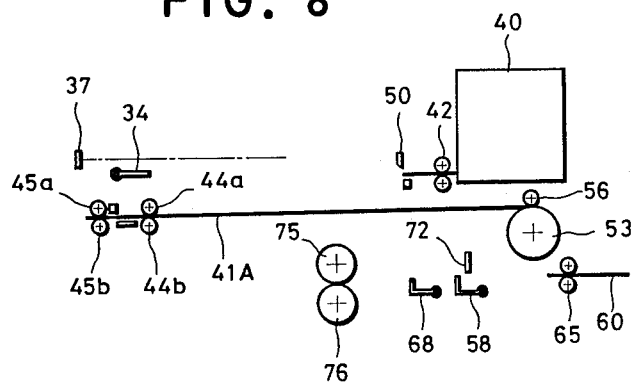

With reference to FIG. 8, when the rear end of the sheet 41A reaches the rotary drum 53, it is gently nipped between the rotary drum 53 and the roller 56. Immediately before the sheet 41A reaches the drum 53, the controller 93 causes the solenoid 35 to raise the mirror shutter 34 out of the optical path P to complete the exposure to the sheet 41A.

Although the roller 56 is suspended by the clutch 107 during the reverse rotation of the rollers 44a to 45b, the sheet 41A, being thrust by the conveyor rollers 44a to 45b, can be nipped between the roller 56 and the drum 53 by itself. Once the sheet 41A is bit by the roller 56 and the drum 53, it is moved along the guide member 55 until the now leading end reaches the first stopper 58.

Figure 9:
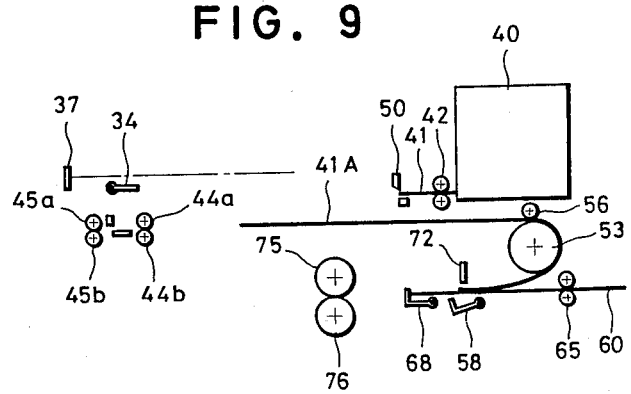

When the sheet 41A is stopped by the first stopper 58, a sensor (not shown) provides a signal in response to which the controller 93 stops the reverse rotation of the motor 108. Thereafter, the controller 93, after energizing the solenoid 59 to retract the first stopper 58 from projecting through the guide member 57, causes the motor 115 to start its rotation to rotate the extrusion roller 64 and the feed rollers 65, thereby to further withdraw the foremost image-receiving sheet 60 and advance it along the guide member 57. At this time, the sheet 41A, having one end bit between the drum 53 and the roller 56, is kept flat at its opposite end placed on the guide member 57. Because the sheet 41A has some elasticity, it acts as an upper guide member for the sheet 60, which enables the sheet 60 to smoothly slip under the sheet 41A. When the sheet 60 contacts the second stopper 68, a sensor (not shown) provides a signal with which the controller 93 stops the motor 115. As is shown in FIG. 9, when the sheet 60 is stopped by the second stopper 68, the funnel 62 of the sheet 60 is overlapped by the sheet 41A. Thereafter, the controller 93 energizes the solenoid 70 to downwardly move the lever 71 with the sealing means 72, thereby connecting the end of the sheet 41A to the funnel 62 of the sheet 60.

After the sheets are connected, the second stopper 68 is retracted and then the motor 108 is started to rotate in the reverse direction, rotating the processing rollers 75 and 76 through the clutches 107 and 113. Simultaneously, the motor 115 is also started to again rotate the rollers 64 and 65, thus advancing the sheet 60. Consequently, the sheet 60 is bit by the processing rollers 75 and 76. The sheet 41A follows the sheet 60. As the extrusion roller 64 continues to rotate, the next image-receiving sheet 60 is withdrawn from the cassette 63 and is bit by the feed rollers 65. When the sensor 67 detects the next sheet 60, the motor 115 is stopped by the controller 93.

The processing rollers 75 and 76 which are pressed against each other by means of a spring member bite and advance the overlapped sheets 41A and 60. At the beginning of this advancement of the overlapped sheets, the processing rollers 75 and 76 rupture the pod 61 to release a developing reagent therefrom and distribute it in a uniform layer between the sheets 41A and 60. The overlapped sheets between which the developing reagent is distributed enter the passage 81 of the constant temperature plate 82 (maintained at a predetermined temperature, e.g., 25° C., by the temperature sensor 83 and the heater 79).

The overlapped sheets 41A and 60 are left with their ends slightly projecting from the passage 81 for diffusion transfer processing. After a predetermined time, the buzzer makes a sound to indicate that the diffusion transfer processing of the overlapped sheets is complete. The door 84 is opened to pull the constant temperature plate 82 partially out of the apparatus 10 via the lever 85. After removing the overlapped sheets from the constant temperature plate 82, the sheet 60 on which the positive image has been formed is peeled apart from the sheet 41A.

To make another copy, another color original is placed on the table 11 and the copying key is operated to start the same sequential control. At this time, as the end of the next image-receiving sheet 60 has been bit between the feed rollers 65, a pre-scanning is immediately started as well as the withdrawal of the paper 41 from the magazine 40. If the cassette 63 is empty, the sensor 67 produces no signal and, in response to the absence of the sensor's signal, the controller 93 causes the motor 115 to start its rotation. As previously described, since the sensor 67 produces no signal for a predetermined period of rotation of the motor 115, the controller 93 stops the motor 115 so as to interrupt the copying operation.

When the paper 41 is depleted or jammed, the sensor 49 will not provide a signal. In this case, a warning message is also displayed on the display device 128. It should be understood that various changes and modifications may be made in the form, details, arrangement and proportions of the parts without departing from the scope of the present invention. Therefore, the appended claims are intended to cover the various changes and modifications of the disclosed invention, as well as the disclosed invention.

What is claimed is:

1. A conveying apparatus in a copying apparatus of the type using two separate diffusion transfer photographic materials and having a photosensitive material in the form of the roll contained in a magazine, means for exposing a photosensitive sheet formed from said photosensitive material at an exposure station so as to form a latent image thereon, and an image-receiving material in the form of image-receiving sheets contained in a cassette, means for superimposing the image-receiving sheet with the photosensitive sheet at a superposition station so as to form a positive image on the image-receiving sheet using a diffusion transfer process, the conveying apparatus comprising:

means for extracting a foremost one of said plurality of image-receiving sheets from the cassette to a position between said pair of feeding rollers;
   a sensor for detecting when said extracted image-receiving sheet is nipped by said pair of feeding rollers;
   a pair of feeding rollers disposed proximate to said cassette for nipping an image-receiving sheet which is therebetween and feeding the image-receiving sheet to said superposition station;
   withdrawing rollers for withdrawing said photosensitive material out of said magazine; and
   a controller for causing said withdrawing rollers to rotate when said sensor detects said extracted image-receiving sheet material and suspending said copying apparatus from performing a copying operation when said sensor does not detect said image-receiving sheet within a predetermined time.

2. A conveying apparatus as defined in claim 1, wherein said plurality of image-receiving sheets are contained in a stacked form in said cassette, and said means for extracting is a roller adapted to enter into said cassette and rotatably contact the foremost sheet which is a sheet on top of said stack.

3. A conveying apparatus as defined in claim 1, further comprising a pair of photosensitive sheet conveying means disposed on first and second opposite sides of said exposure station for conveying said photosensitive sheet from said first side tos aid second side and from said second side to said first side.

4. A conveying apparatus as defined in claim 3, wherein each of said pair of photosensitive sheet conveying means comprises a pair of rollers.

5. A conveying apparatus as defined in claim 4, further comprising guide means extending between said feeding rollers and one of said pair of conveying means on said first side of said exposure station.

6. A conveying apparatus as defined in claim 5, wherein said guide means comprises first and second guide members, said first guide member being inclined at an angle to said second guide member and having one end deviated in a direction away from said first guide member.

7. A method of performing a copying operation, wherein said method comprises the steps of:
   withdrawing from a magazine a photosensitive material in the form of a roll contained in a magazine;
   forming a photosensitive sheet from said photosensitive material;
   extracting a foremost one of a plurality of image-receiving sheets from a cassette to a position between a pair of feeding rollers;
   detecting when said extracted image-receiving sheet is nipped by said pair of feeding rollers;
   exposing the photosensitive sheet at an exposure station so as to form a latent image thereon, and superposing the image-receiving sheet with the photosensitive sheet at a superposition station so as to form a positive image on the image-receiving sheet using a diffusion transfer process, in response to detection of the nipped image-receiving sheet; and
   suspending the copying operation when said sensor does not detect said image-receiving sheet within a predetermined time.

* * * * *